US012353473B2

(12) United States Patent
Mopur et al.

(10) Patent No.: US 12,353,473 B2
(45) Date of Patent: Jul. 8, 2025

(54) IMAGE DATA BIAS DETECTION WITH EXPLAINABILITY IN MACHINE LEARNING

(71) Applicant: HEWLETT PACKARD ENTERPRISE DEVELOPMENT LP, Houston, TX (US)

(72) Inventors: Satish Kumar Mopur, Bangalore (IN); Krishnaprasad Lingadahalli Shastry, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 419 days.

(21) Appl. No.: 17/859,915

(22) Filed: Jul. 7, 2022

(65) Prior Publication Data
US 2024/0012852 A1 Jan. 11, 2024

(51) Int. Cl.
*G06F 16/55* (2019.01)
*G06V 10/762* (2022.01)
*G06V 10/778* (2022.01)

(52) U.S. Cl.
CPC ............ *G06F 16/55* (2019.01); *G06V 10/762* (2022.01); *G06V 10/7796* (2022.01)

(58) Field of Classification Search
CPC ........ G06N 20/00; G06N 3/088; G06N 5/045; G06V 10/762; G06V 10/44; G06V 10/50; G06V 10/761; G06V 2201/03; G06V 10/7796; G06V 10/72; G06V 10/763; G06V 10/774; G16H 50/20; G06T 2207/20081; G06T 7/0002; G06F 16/55; G06F 16/906
See application file for complete search history.

(56) References Cited

U.S. PATENT DOCUMENTS

| 7,260,259 B2 | 8/2007 | Comaniciu et al. |
| 11,256,989 B2 | 2/2022 | Dalli et al. |
| 2020/0279411 A1 | 9/2020 | Atria et al. |

(Continued)

OTHER PUBLICATIONS

M. Atay, H. Gipson, T. Gwyn and K. Roy, "Evaluation of Gender Bias in Facial Recognition with Traditional Machine Learning Algorithms," 2021 IEEE Symposium Series on Computational Intelligence (SSCI), Orlando, FL, USA, 2021 (Year: 2021).*

(Continued)

*Primary Examiner* — Sumati Lefkowitz
*Assistant Examiner* — Aaron Joseph Sorrin
(74) *Attorney, Agent, or Firm* — Sheppard Mullin Richter & Hampton LLP

(57) ABSTRACT

Bias in Machine Learning (ML) is when an ML algorithm tends to incompletely learn relevant and important patterns from a dataset, or learns the patterns from data incorrectly. Such inaccuracy can cause the algorithm to miss important relationships between patterns and features in data, resulting in inaccurate algorithm predictions. Systems and methods for detecting potential ML bias in input image datasets are described herein. After a target image is received, a subset of images related to the target image is extracted. The target image and subset of images are analyzed under an imbalance assessment and data bias assessment to determine the presence of any potential data bias in a ML training pipeline. If any data bias is determined, one or more messages summarizing the assessments and including explanations to enable more accurate predictions in image assessments are sent to the user.

15 Claims, 6 Drawing Sheets

(56) References Cited

U.S. PATENT DOCUMENTS

| 2020/0380310 | A1* | 12/2020 | Weider | G06F 18/2185 |
| 2021/0350172 | A1 | 11/2021 | Ting | |
| 2023/0131834 | A1* | 4/2023 | Sankaranarayanan | G06N 3/088 706/25 |
| 2024/0095588 | A1* | 3/2024 | Vandikas | G06N 20/00 |

OTHER PUBLICATIONS

Borrajo et al., "Bandwidth selection for kernel density estimation with length-biased data", Journal of Nonparametric Statistics, Jun. 2016, 31 pages.
"CXR8_Powered by Box", available online at <https://nihcc.app.box.com/v/ChestXray-NIHCC>, 2017, 1 page.
AWS, "Amazon Web Services Documentation", available online at <https://docs.aws.amazon.com/sagemaker/latest/dg/clarify-measure-data-bias.htmlPapers>, 2025, 1 page.
Baptiste Moreau, "Bias in your datasets: COVID-19 case study", available online at <https://towardsdatascience.com/bias-in-your-datasets-covid-19-case-study-d065aa698b74/>, May 4, 2021, 22 pages.
Kaggle, "USPS dataset", available online at <https://web.archive.org/web/20230607040425/https://www.kaggle.com/datasets/bistaumanga/usps-dataset>, Jun. 7, 2023, 2 pages.
Larrazabala et al., "Gender imbalance in medical imaging datasets produces biased classifiers for computeraided diagnosis", Jun. 9, 2020, 3 pages.
Schaaf et al., "Towards Measuring Bias in Image Classification", Jul. 1, 2021, 12 pages.
Tensorflow, "mnist", available online at <https://www.tensorflow.org/datasets/catalog/mnist>, 2024, 3 pages.
The Linux Foundation, "AI Fairness 360: Understand and mitigate bias in ML models", available online at <https://ai-fairness-360.org/>, 2024, 3 pages.
Vokinger et al., "Mitigating bias in machine learning for medicine", 2021, 3 pages.
Wang et al., "Revise: A Tool for Measuring and Mitigating Bias in Visual Datasets", Jul. 23, 2021, 22 pages.

* cited by examiner

IMAGE DATA BIAS DETECTION WITH EXPLAINABILITY IN MACHINE LEARNING

BACKGROUND

Artificial intelligence has significant power and potential to make a positive impact on lives and nature. Its use has pervaded across all industries spanning Healthcare, Manufacturing, Finance, Retail and Life Sciences. It is of utmost importance to apply the principles and power of AI in an un-biased, non-discriminative manner, with ethics and trustworthiness.

Bias in Machine Learning (ML) is when an ML algorithm tends to incompletely learn relevant and important patterns from a dataset, or learns the patterns from data incorrectly. Such inaccuracy can cause the algorithm to miss important relationships between patterns and features in data or assert relationships that do not actually exist between patterns and features in data, resulting in inaccurate algorithm predictions.

When ML bias is present in Artificial Intelligence (AI) environments, bias may occur across all stages of the ML development. The ML bias may cause social bias by compounding discriminative data of attributes of individuals such as socioeconomic status, age, race, gender, disability, income, religion and demography. Such social bias may further lead to statistical bias where the ML model inaccurately represents the data. The statistical bias in data may be caused by an imbalance in attributes, lack of sufficiency in the data, and ineffective collection of data. The statistical bias in data may lead to biased predictions which may result in serious consequences in AI environments for particular industries, such as Healthcare and Finance.

Currently, image datasets are unstructured in nature and heterogeneous. Data bias may be present in image datasets due to variations in imaging equipment and the quality of images provided for each type of imaging equipment, image transformation, influence of attributes due to improper representation of image datasets (i.e., skin tone in facial recognition or gender in healthcare), and domain-specific data. Therefore, there is a need for ML models trained with images with varying features to contribute in the reduction and prevention of inaccurate predictions of real world data shown on images. Solutions are disclosed herein to detect potential ML bias in input image datasets by assessing feature differences in the input image dataset, and providing a resulting analysis to a user.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments. These illustrative examples are mentioned not to limit or define the disclosure, but to provide examples to aid understanding thereof. Additional examples are discussed in the Detailed Description, and further description is provided there.

Figure 1:
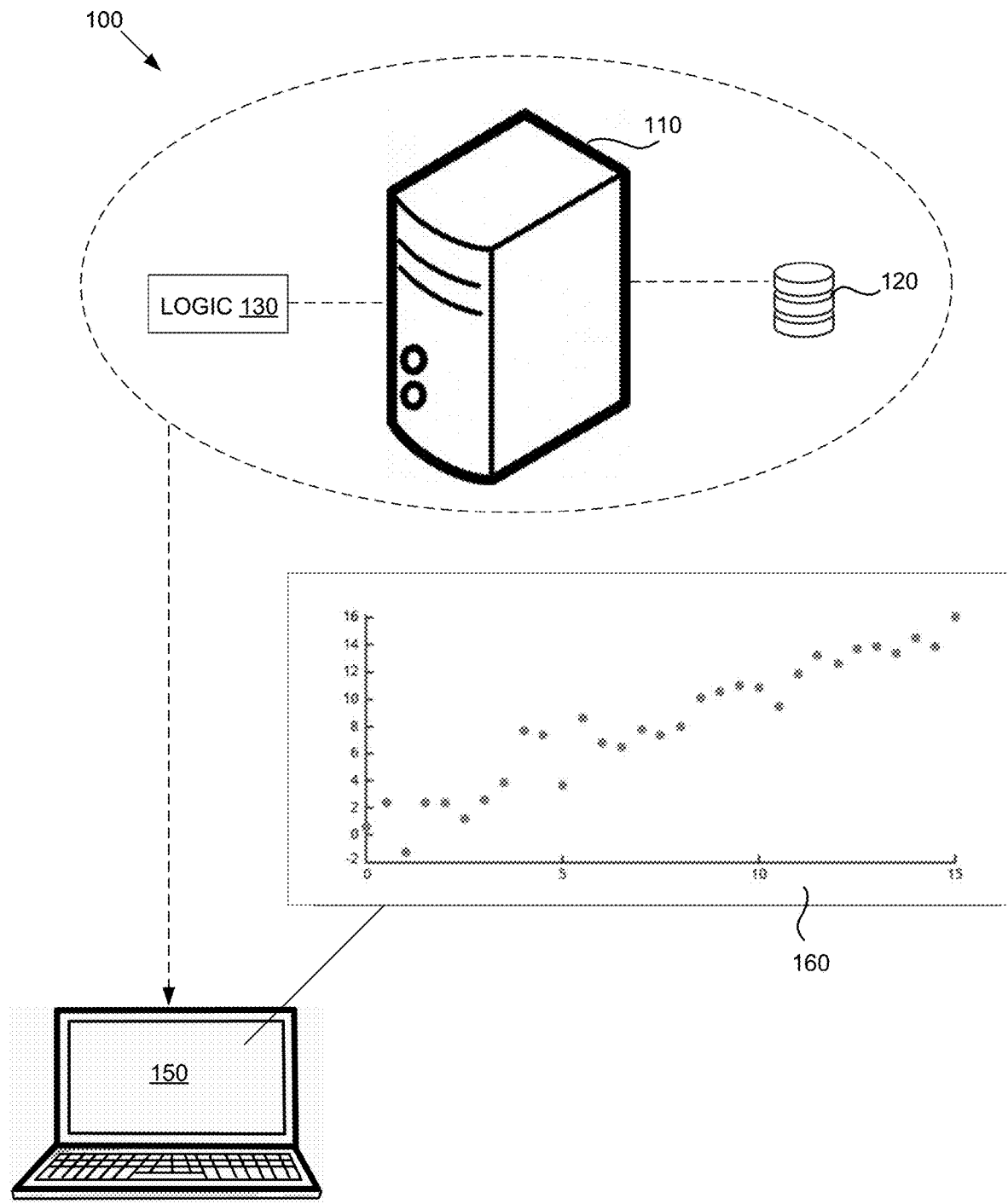
FIG. 1 is an example illustration of a computing system that detects potential ML data bias in input image datasets, according to example embodiments described in the present disclosure.

The figures are not exhaustive and do not limit the present disclosure to the precise form disclosed.

DETAILED DESCRIPTION

Image datasets may be used to provide accurate predictions regarding features displayed in a particular image. Machine learning (ML) models trained with images with varying features, attributes and labels may help contribute in the reduction and prevention of inaccurate predictions of real world data shown on images. To help increase the probability of obtaining accurate predictions, it is critical to have accurate classification labels of images, attributes associated with each image, and the features shown in each image to contribute to the learning of an ML model. The accuracy in the classification labels of images, attributes, and features may help with all forms of detection, such as early disease diagnosis, facial recognition, signature forgery detection, and foreign body detection. The ML model may also help with domain adaptation of images, so that regardless of the domain source used to capture an image, the features of an image may still be scanned, extracted and classified by ML Models with similar reference images.

To address this need of providing accurate predictions regarding features displayed in images, a solution is to bring in potential data bias detections into an ML training pipeline. The ML training pipeline may include the assessment of feature differences in image datasets. Such assessment may detect and determine if images in the dataset contain data bias that may contribute to inaccurate predictions. The ML training pipeline may further compute analysis of the assessments. Such analysis may be provided to a user with explanations regarding the cause of any determined data bias so the user may enable corrective actions, such as image augmentation or ML model hyperparameter tuning to learn the features that are under-represented. The system may adaptively receive input image datasets while performing assessment of data bias detection with or without external intervention.

The solution may be to also incorporate concurrent pipeline processing of mean shift clustering computation across multiple CPU resources, in order to accelerate the computational process of the ML training pipeline model. This may also improve the overall image processing throughput and the rapid assessment of data bias detection as images are inputted into the bias detection flow process. The enhanced clustering technique, of processing computation across multiple CPU resources, in combination with the assessments and computation acceleration of the ML pipeline model are the highlighting components to improve potential data bias detection in a timely manner, and enable the determination of accurate predictions in image assessment. These highlighting components will also mitigate manual user inspection, mitigate trial and error for image segmentation, augment accuracy in feature detection, and accelerate computational performance of the solution.

Described herein are solutions that address the problems described above. In some embodiments, a computing system may be a ML training pipeline and model. In other embodiments, the computing system may provide a systematic way of detecting and analyzing potential data bias in input image datasets in an ML pipeline. In various embodiments, the computing system may receive an input target image. The input target image may comprise one or more attributes and features. A user may specify particular attributes of a target image to be assessed against an image training dataset to determine potential data bias. After receiving the input target image, the computing system may identify, segregate and extract a subset of images from an image training database based on the attributes and features of the input target image. The image training database may hold a plurality of image training datasets that may be used for any type of input target image with any combination of attributes and features. The computing system may then perform a class imbalance assessment on the subset of images. The class imbalance assessment can indicate if the subset of images extracted based on the attributes of the input target image contain any potential data bias. The class imbalance assessment may find potential bias if it determines an imbalance is present in the subset of images compared to other groups of images.

The computing system may further perform mean shift clustering on the subset of images and the input target image to determine the cluster of data distribution per image, with each cluster representing a feature of the respective image. The computing system may then compare the clusters in the input target image with the clusters in each image in the subset, and analyze a distribution difference of the clusters between the input target image and each individual image in the subset. Once the clusters in the input target image have been compared and analyzed against the clusters of all of the images in the subset, the computing system may then perform a data bias assessment on the clusters in the input target image. The data bias assessment may detect and determine any potential data bias in the input target image. Data bias will be present if the overall distribution difference between the dusters of the input target image and the clusters of all of the images in the subset is greater than a threshold. Any data bias that is determined based on the class imbalance assessment and the distribution difference of clusters can be summarized. The computing system may then send a message of the summary of data bias to the user. These and other features of the examples of the present disclosure are discussed herein.

FIG. 1 illustrates an example of a computing system 100 which may be internal or otherwise associated within a device 150. In some embodiments, the computing system 100 may be a ML pipeline and model. In some examples, the device 150 may be a computing device, such as a desktop computer, a laptop, a mobile phone, a tablet device, an Internet of Things (IoT) device, etc. The device 150 may output and display an image 160 of a dataset on a screen of device 150. The image 160 may be a two dimensional (2D) graphical representation of a dataset showing the various outputs predicted by a ML model based on various X and Y variables. The computing component 110 may perform one or more available assessments on input image datasets to detect any potential data bias. The image 160 may display any potential bias on the input image datasets based on the one or more performed assessments. The computing component 110 may include one or more hardware processors and logic 130 that implements instructions to carry out the functions of the computing component 110, for example, receiving an input target image, identifying and extracting a subset of images from an image database based on one or more attributes of the input target image, analyzing the subset of images to determine a class imbalance assessment, performing mean shift clustering on the input target image and each image in the subset, determining one or more clusters in the input target image and each image in the subset based on the mean shift clustering, performing data bias assessment on the clusters of the input target image, and sending one or more messages of data bias based on the class imbalance assessment and the data bias assessment. The computing component 110 may store, in a database 120, details regarding scenarios or conditions in which some algorithms, image datasets, and assessments are performed and used to determine potential data bias in input image datasets. Some of the scenarios or conditions will be illustrated in the subsequent FIGS.

Figure 2:
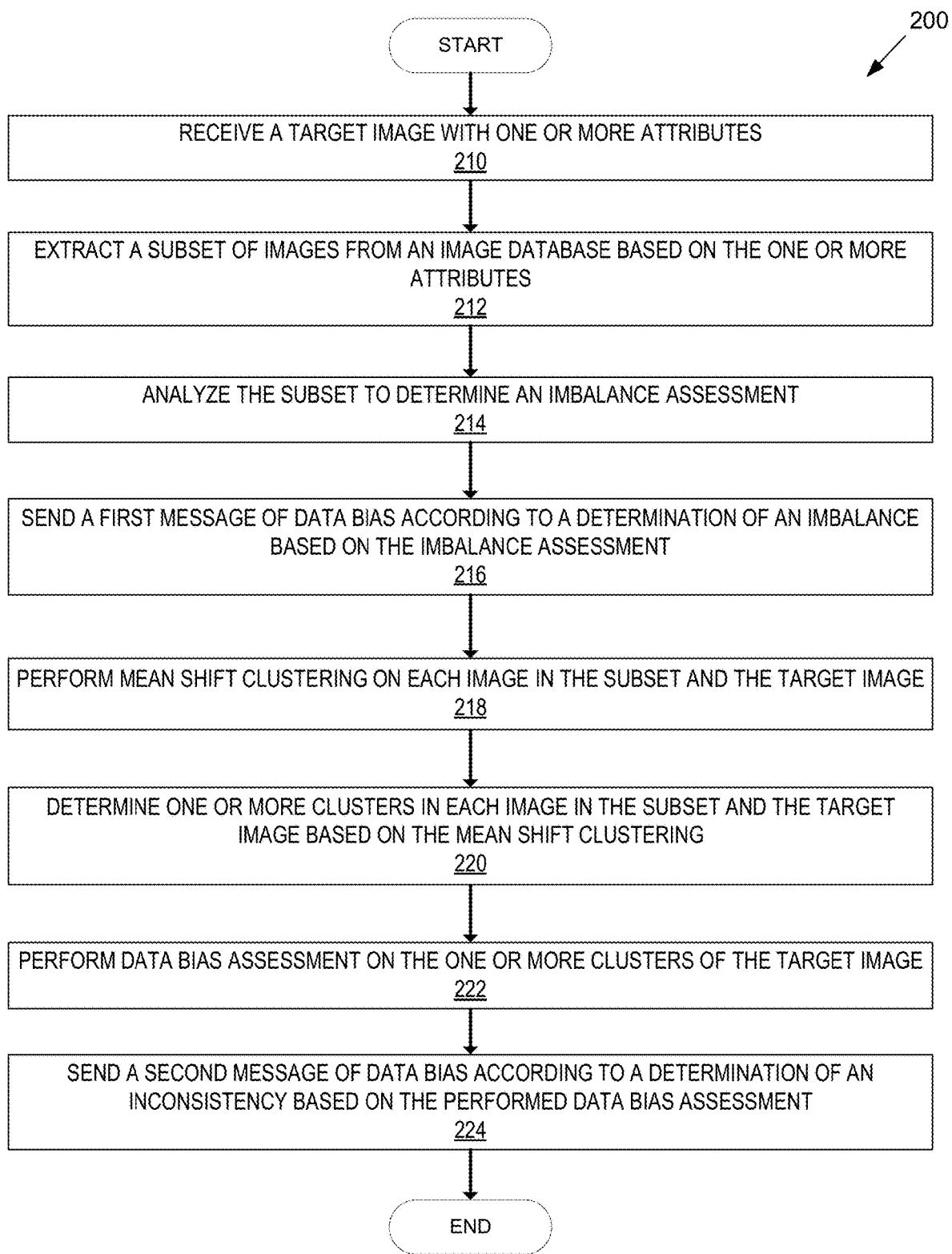
FIG. 2 is an example flowchart of a process, illustrating how potential ML bias is detected in input image datasets according to various embodiments of the present disclosure.

FIG. 2 illustrates an example scenario in which the process 200 may selectively perform one or more types of assessments on input image datasets, for example, in order to detect any potential data bias in the ML pipeline. In some embodiments, the process 200 can be executed, for example, by the computing component 110 of FIG. 1. In other embodiments, the process 200 may be implemented as the computing component 110 of FIG. 1. The computing component 110 may be, for example, the process 300 of FIG. 3, the process 400 of FIG. 4, and the computing component 500 of FIG. 5. The computing component 110 may include a server.

At block 210, the computing component 110 receives a target image. The target image may be inputted into the device 150, for the computing component 110 to receive, by a user. The target image may include one or more features, attributes, and/or labels. Features may include prominent segments in images of persons, objects, structures, items, and any other matter that can be displayed in that image. Attributes may include age, gender, race, ethnicity, religion, income, demography, material, and any other factors or features that may be directly associated with one or more features in a particular image. Labels may be classifications or descriptions of the overall image. In some embodiments, attributes associated to a target image may be assigned by the user before inputting the target image into the device 150. In other embodiments, attributes associated with the target image may be determined after the target image has been received by the computing component 110, using one or more algorithms to detect attributes of an image. The target image may be labeled with a classification or description that describes the type of image it is or what is displayed in the image. In some embodiments, labels of the target image may be assigned before the target image is inputted into the device 150.

In an example, a target image may be an x-ray image displaying features of a human body, such as the lungs. Before the user inputs the target image into the device 150, the user may assign attributes of the person whose lungs and heart are shown in the x-ray image. The user may assign, as an example, the attributes of $50k for income, and the name of a country for ethnicity. The user may assign the attributes of female for gender, and the name of a country for ethnicity. After the image has been received by the device 150, the computing component 110 may use one or more algorithms to determine any additional attributes associated with the person whose lungs and heart are displayed in the x-ray target image, such as 56 for age, male for gender, and White/Caucasian for race. The target image may also be labeled with a classification of "lungs" before the target image is inputted into the device 150.

At block 212, the computing component 110 extracts a subset of target images from an image database. After receiving the target image and determining the one or more attributes associated with the target image, the computing component may first identify a group or subset of reference images from a reference image database, where the subset of reference images are chosen based on the classification label of the target image and/or the attributes associated with the target image. The reference images may be considered as source image datasets. The reference image database may contain a large number of images, with each image belonging to one or more subsets based on any combination of classification labels and attributes associated with each image. The image database may be stored in the database 120. After a subset of reference images have been identified according to the classification label(s) and/or attribute(s) of the target image, the computing component 110 may extract the subset of reference images from the reference image database.

At block 214, the computing component 110 may analyze the subset of images to determine an imbalance assessment. After extracting the subset of images from the image database according to the classification label(s) and/or attribute(s) of the target image, the computing component 110 may analyze the subset of images by performing a class imbalance assessment on the subset of images. The class imbalance assessment may indicate if the subset of images extracted based on the classification label(s) and/or attribute(s) of the target image can cause any potential data bias.

In some embodiments, the class imbalance assessment may be performed using a histogram analysis. To perform the class imbalance assessment, the computing device may first identify one or more reference image groups from the reference image database, where the one or more reference image groups contain a similar classification label(s) and/or attribute(s) as the target image. After one or more reference image groups has been identified, the computing component 110 may determine the quantity of images in each reference image group. The computing component 110 may then analyze and compare the different quantities of images for each reference image group against the total quantity of images amongst all of the reference image groups. Such analysis and comparison may determine an average quantity or percentage of images in a particular reference image group amongst all of the reference image groups. In some embodiments, the average quantity or percentage of images may represent an imbalance threshold or minimum number of reference images that are necessary in each reference image group in order to obtain accurate predictions in the analysis of input target images and datasets. In other embodiments, the imbalance threshold may be a pre-determined percentage of the total quantity of reference images between all of the reference image groups. A subset of reference images that do not contain a quantity or percentage of reference images that is equal to or greater than the imbalance threshold may be determined to be imbalanced. An imbalanced subset of reference images may contain potential data bias and provide inaccurate predictions in the ML model.

In an example, for a target image with a classification label of "lung" and "pneumonia," and with attributes of 56 for age, male for gender, and White/Caucasian for race, a subset of images containing 55 reference images was identified to have the same labels and attributes, and was extracted. The computing component 110 further identified 6 reference image groups from the reference image database. Each of the 6 reference image groups have the label of "lung" and the same attributes of 56 for age, male for gender, and White/Caucasian for race, but include second label other than "pneumonia," such as "asthma," "pneumothorax," "smoking," "cancer," "bronchitis," and "emphysema." The 6 reference image groups have a quantity of 88, 106, 94, 98, 65, and 77 reference images, respectively. The average quantity of reference images amongst the 6 reference image groups is 88 ((88+106+94+98+65+77)/6). If the imbalance threshold is 88, then the subset of images is imbalanced since its quantity of 55 reference images is below the imbalance threshold of 88. If the imbalance threshold is a pre-determined percentage of 10%, then the subset of images is balanced since the imbalance threshold will be 52.8 (10%*(88+106+94+98+65+77)) and 55 is greater than 52.8.

The computing component 110 may then determine the results of the class imbalance assessment on the subset of images. The computing component 110 may compare the quantity of reference images in the subset of images to the imbalance threshold of reference images. If the subset of images extracted based on the features and/or attributes of the target image contains a quantity of reference images that is below the imbalance threshold of reference images, then it may be determined that the subset of images is imbalanced and contains potential data bias. If the subset of images contain a quantity of reference images equal to or greater than the imbalance threshold, then it may be determined that the subset of images is not imbalanced and does not contain any potential data bias.

At block 216, the computing component 110 may send a message of data bias found in the subset of images to the user. The computing component 110 may summarize the imbalance assessment performed on the subset of images. The summary may include all of the labels, attributes and reference image groups used in the imbalance assessment. The summary may also include a detailed explanation of what caused the imbalance result. The computing component 110 may include the summary of the imbalance assessment, along with the results of an imbalance, into a message. The computing component 110 may then send the message to the user. The user may be able to fully understand the reasons causing the imbalance in the subset of images, and be able to adjust the data through techniques such as data augmentation, adjust the ML model or other factors of the computing system of ML pipeline to obtain a balanced result from the imbalance assessment.

At block 218, the computing component 110 may perform Mean Shift clustering on each reference image in the subset of images and the target image. The mean shift clustering performed on each image may determine one or more clusters of data distribution per image. Each cluster in an image may represent a feature of the respective image. Each feature represented by a cluster may be a feature that is important or that stands out in the respective image.

Mean shift clustering may be a non-parametric algorithm that uses kernel density estimation and kernel bandwidth to establish an underlying data distribution of a particular image. The kernel density estimation and kernel bandwidth may be used to assign datapoints to clusters iteratively by shifting points towards the highest density of datapoints. The kernel bandwidth may be manually specified by the user as part of a trial and error process with prior visualization of the images. In an example, a tall and thin kernel bandwidth may be used, which may result in a large cluster count with a small density for each cluster. In another example, a short and fat kernel bandwidth may be used, which may result in a smaller cluster count with a larger density for each cluster. Using manually specified kernel bandwidths may be a disadvantage as it is cumbersome and an error prone process when assessing a large set of heterogeneous images. This may be overcame by applying an algorithm that automatically computes kernel bandwidth for mean shift clustering.

The algorithm for mean shift clustering may include 4 steps. In the first step, the computing component 110 may compute the Hopkins Statistic ("H") for a particular image. In the second step, the computing component 110 may use the Hopkins Statistic (H) to derive the Quantile value ("Q") for the particular image, using a mirrored sigmoid function from H. In the third step, the computing component 110 may estimate the kernel bandwidth for the particular image, using the Quantile value (Q). In the fourth step, the computing component 110 may perform the mean shift clustering on the particular image. This mean shift clustering algorithm may be performed for each reference image in the subset of images and for the target image.

In some embodiments, the mean shift clustering of each image may be performed in series. In other embodiments, the mean shift clustering of each image may be performed in parallel across multiple processors in the computing system 200. The ability to perform the mean shift clustering of multiple images in parallel across multiple processors may accelerate the computational performance process of clustering images. The acceleration of the computational performance process of clustering images may further lead to the acceleration of the computational performance process of performing the data bias assessment of the target image.

At block 220, the computing component 110 may determine the clusters of data points in the target image and in each reference image in the subset of images. The computing component 110 may group each individual cluster of data points in an image by placing a border around each individual cluster to clearly display the data points in the image that are within each cluster.

At block 222, the computing component 110 may perform data bias assessment on the clusters of the target image. Data bias assessment may be performed by assessing distribution differences across the clusters of the reference images with the clusters of the target image. In some embodiments, the data bias assessment may be performed using an ML algorithm, where the ML algorithm may use the data of the assessment of distribution differences across the clusters of the reference images to create ML models. The ML models may then be trained to recognize patterns from the data of the assessment to determine the presence of data bias. The computing component 110 may compare the clusters in the target image with the clusters in each reference image in the subset of images, and analyze a distribution difference of the clusters between the target image and each individual reference image in the subset of images. Data bias may be determined once the clusters in the target image have been compared and analyzed against the clusters of all of the reference images in the subset of images. A data bias may be present if the overall distribution difference between the clusters is greater than a consistency threshold. The overall distribution difference between the clusters may be a calculated balance of each difference between the clusters of the target image and each reference image in the subset of images. In some embodiments, the consistency threshold may be a pre-determined quantity of a difference. In other embodiments, the consistency threshold may be a pre-determined percentage of the total difference between the clusters of the target image and all of the reference images in the subset of images. When the data bias assessment results in the overall distribution difference between the clusters being greater than the consistency threshold, the computing component 110 may determine an inconsistency result. An inconsistency result may indicate the presence of data bias in the target image.

At block 224, the computing component 110 may send a message of data bias found in the target image to the user. The computing component 110 may summarize the data bias assessment performed on the target image. The summary may include all of the labels, attributes and the subset of images used in the data bias assessment. The summary may also include the values of the variables determined by the performance of mean shift clustering on the target image and on each reference image in the subset of images. The summary may further include a detailed explanation of what caused the inconsistency result of the data bias assessment. The computing component 110 may include the summary of the data bias assessment, along with the results of an inconsistency, into a message. The computing component 110 may then send the message to the user. The user may be able to fully understand the reasons causing the inconsistency in the target image, and be able to adjust the data through techniques such as data augmentation, adjust the ML model or other factors of the computing system of ML pipeline to obtain a consistent result from the data bias assessment.

For simplicity of description, the process 200 is described as being performed with respect to a single received target image. It should be appreciated that, in a typical embodiment, the computing component 110 may manage a plurality of target images in short succession of one another. For example, in some embodiments, the computing component 110 can perform many, if not all, of the steps in process 200 on a plurality of target images as the target images are received.

As explained, the process 200 may provide a solution in improving the detection of potential data bias in a ML training pipeline and enabling more accurate predictions in image assessments. Process 200 may also provide improvements in the computational process of the ML training pipeline model by incorporating concurrent pipeline processing across multiple CPU resources. These improvements may also mitigate manual user inspection, mitigate trial and error for image segmentation, augment accuracy in feature detection, and accelerate computational performance of the solution.

Figure 3:
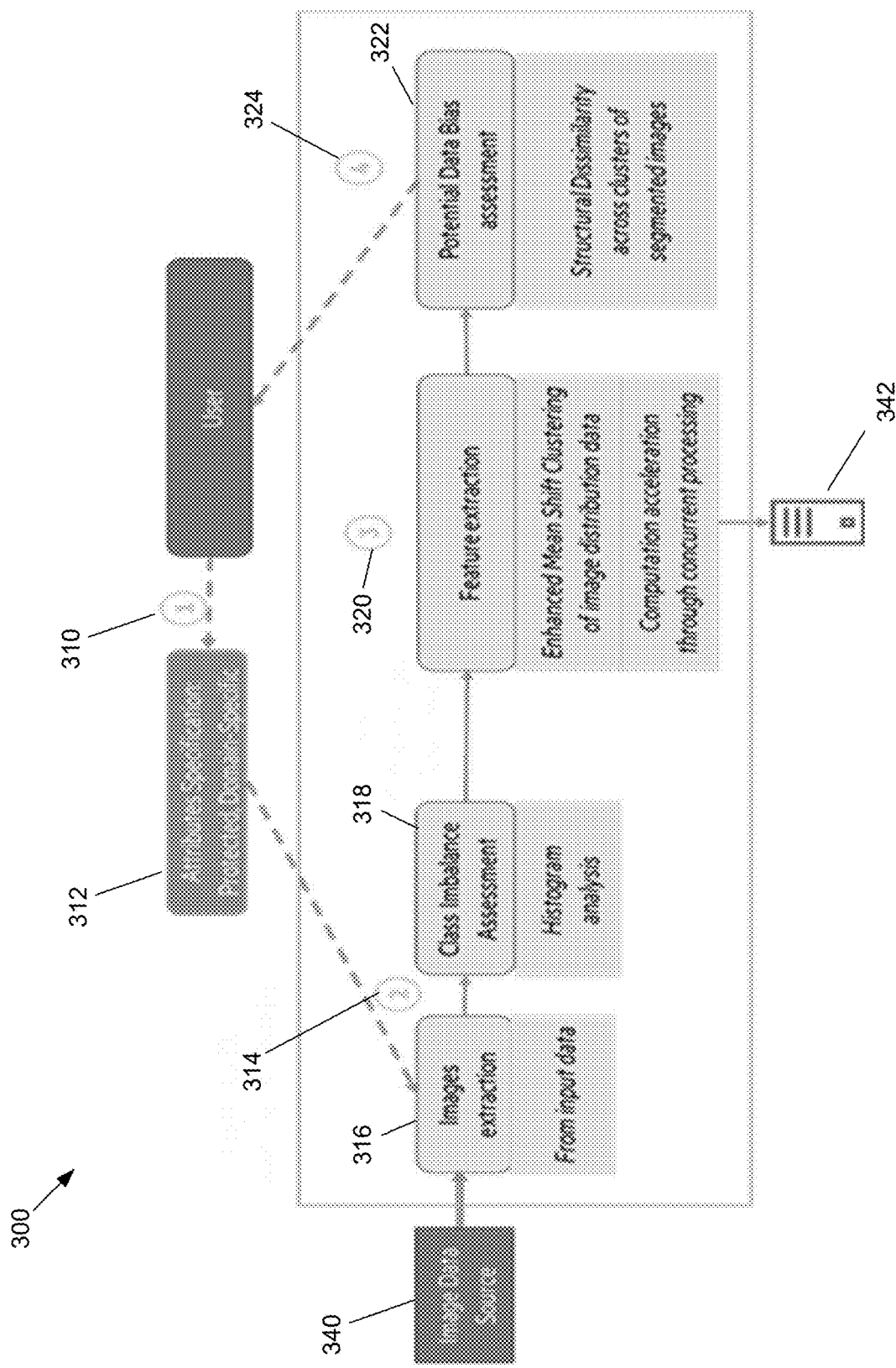
FIG. 3 is an example illustration of a process for detecting potential ML data bias in input image datasets according to various embodiments of the present disclosure.

FIG. 3 illustrates an example scenario in which the process 300 may selectively perform multiple types of assessments on input image datasets, for example, in order to detect any potential data bias in the ML pipeline. In some embodiments, the process 300 can be executed, for example, by the computing component 110 of FIG. 1. In other embodiments, the process 300 may be implemented as the computing component 110 of FIG. 1. The computing component 110 may be, for example, the process 200 of FIG. 2, the process 400 of FIG. 4, and the computing component 500 of FIG. 5. The computing component 110 may include a server.

Step 310 of process 300 is similar to block 210 of process 200. At step 310, the computing component 110 receives a target image. The target image may be inputted into the device 150, for the computing component 110 to receive, by a user. The target image may include one or more features, attributes, and/or labels. Features may include prominent segments in images of persons, objects, structures, items, and any other matter that can be displayed in an image. Attributes may include age, gender, race, ethnicity, religion, income, demography, material, and any other factors or features that may be directly associated with one or more features in a particular image. Labels may be classifications or descriptions of the overall image. In some embodiments, attributes associated a target image may be assigned by the user before inputting the target image into the device 150. In other embodiments, attributes associated with the target image may be determined after the target image has been received by the computing component 110, using one or more algorithms to detect attributes of an image. The target image may be labeled with a classification or description that describes the type of image it is or what is displayed in the image. In some embodiments, labels of the target image may be assigned before the target image is inputted into the device 150.

At step 312, the computing component 110 determines the attributes associated with the target image. After a target image is received, the computing component 110 may determine attributes associated with the target image. The target image may already have attributes assigned to it. The computing component 110 may scan the target image and identify any additional attributes associated with the target image that have not already been assigned to the target image. Any additional attributes identified may be assigned to the target image by the computing component 110.

At step 314, the computing component 110 determines the labels associated with the target image. After a target image is received, the computing component 110 may determine labels associated with the target image. The target image may already have labels assigned to it. The computing component 110 may scan the target image and identify any additional labels associated with the target image that have not already been assigned to the target image. Any additional labels identified may be assigned to the target image by the computing component 110.

Step 316 of process 300 is similar to block 212 of process 200. At step 316, the computing component 110 extracts a subset of images from an image data source. After receiving the target image and determining the one or more attributes and labels associated with the target image, the computing component may first identify a group or subset of reference images from an image data source 340, where the subset of reference images are chosen based on the classification label of the target image and/or the attributes associated with the target image. The reference images may be considered as source image datasets. The image data source 340 may be an image database and contain a large number of images, with each image belonging to one or more subsets based on any combination of classification labels and attributes associated with each image. The image data source 340 may be stored in the database 120. After a subset of reference images have been identified according to the classification label(s) and/or attribute(s) of the target image, the computing component 110 may extract the subset of reference images from the image data source 340.

Step 318 of process 300 is similar to block 214 of process 200. At step 318, the computing component 110 may analyze the subset of images to determine an imbalance assessment. After extracting the subset of images from the image data source 340 according to the classification label(s) and/or attribute(s) of the target image, the computing component 110 may analyze the subset of images by performing a class imbalance assessment on the subset of images. The class imbalance assessment may indicate if the subset of images extracted based on the classification label(s) and/or attribute(s) of the target image contain any potential data bias.

In some embodiments, the class imbalance assessment may be performed using a histogram analysis. To perform the class imbalance assessment, the computing device may first identify one or more reference image groups from the reference image database, where the one or more reference image groups contain a similar classification label(s) and/or attribute(s) as the target image. After one or more reference image groups has been identified, the computing component 110 may determine the quantity of images in each reference image group. The computing component 110 may then analyze and compare the different quantities of images for each reference image group against the total quantity of images amongst all of the reference image groups. Such analysis and comparison may determine an average quantity or percentage of images in a particular reference image group amongst all of the reference image groups. In some embodiments, the average quantity or percentage of images may represent an imbalance threshold or minimum number of reference images that are necessary in each reference image group in order to obtain accurate predictions in the analysis of input target images and datasets. In other embodiments, the imbalance threshold may be a pre-determined percentage of the total quantity of reference images between all of the reference image groups. A subset of reference images that do not contain a quantity or percentage of reference images that is equal to or greater than the imbalance threshold may be determined to be imbalanced. An imbalanced subset of reference images may introduce potential data bias and provide inaccurate predictions in the ML model.

In an example, for a target image with a classification label of "arm" and "fracture," and with attributes of 12 for age, female for gender, and Hispanic for race, a subset of images containing 72 reference images was identified to have the same labels and attributes, and was extracted. The computing component 110 further identified 4 reference image groups from the image data source 340. Each of the 4 reference image groups have the label of "arm" and the same attributes of 12 for age, female for gender, and Hispanic for race, but include a second label other than "fracture," such as "burn," "bruised," "dislocated," and "broken." The 4 reference image groups have a quantity of 34, 156, 27, and 43 reference images, respectively. The average quantity of reference images amongst the 4 reference image groups is 65 ((34+156+27+43)/4). If the imbalance threshold is 65, then the subset of images is balanced since its quantity of 72 reference images is greater than the imbalance threshold of 65. If the imbalance threshold is a pre-determined percentage of 30%, then the subset of images is imbalanced since the imbalance threshold will be 78 (30%*(34+156+27+43)) and 72 is less than 78.

Step 320 of process 300 is similar to block 218 of process 200. At step 320, the computing component 110 may perform mean shift clustering on each reference image in the subset of images and the target image. The mean shift clustering performed on each image may determine one or more clusters of data distribution per image. Each cluster in an image may represent a feature of the respective image. Each feature represented by a cluster may be a feature that is important or that stands out in the respective image.

Mean shift clustering may be a non-parametric algorithm that uses kernel density estimation and kernel bandwidth to establish an underlying data distribution of a particular image. The kernel density estimation and kernel bandwidth may be used to assign datapoints to clusters iteratively by shifting points towards the highest density of datapoints. The kernel bandwidth may be manually specified by the user as part of a trial and error process with prior visualization of the images. In an example, a tall and thin kernel bandwidth may be used, which may result in a large cluster count with a small density for each cluster. In another example, a short and fat kernel bandwidth may be used, which may result in a smaller cluster count with a larger density for each cluster. Using manually specified kernel bandwidths may be a disadvantage as it is cumbersome and an error prone process when assessing a large set of heterogeneous images. This may be overcame by applying an algorithm that automatically computes kernel bandwidth for mean shift clustering.

The algorithm for mean shift clustering may include 4 steps. In the first step, the computing component 110 may compute the Hopkins Statistic ("H") for a particular image. In the second step, the computing component 110 may use the Hopkins Statistic (H) to derive the Quantile value ("Q") for the particular image, using a mirrored sigmoid function from H. In the third step, the computing component 110 may estimate the kernel bandwidth for the particular image, using the Quantile value (Q). In the fourth step, the computing component 110 may perform the mean shift clustering on the particular image. This mean shift clustering algorithm may be performed for each reference image in the subset of images and for the target image.

The mean shift clustering performed on each image may determine one or more clusters of data distribution in each respective image. Each cluster in the each respective image may represent a feature of the respective image. Each feature represented by a cluster may be a feature that is important or that stands out in the respective image. Mean shift clustering may be performed on each reference image in the subset of images and on the target image. In some embodiments, the mean shift clustering of each image may be performed in series. In other embodiments, the mean shift clustering of each image may be performed in parallel across multiple processors 342 in the computing system 300. The ability to perform the mean shift clustering of multiple images in parallel across multiple processors 342 may accelerate the computational performance process of clustering images. The acceleration of the computational performance process of clustering images may further lead to the acceleration of the computational performance process of performing the data bias assessment of the target image.

The computing component 110 may then determine the clusters of data points in the target image and in each reference image in the subset of images. The computing component 110 may group each individual cluster of data points in an image by placing a border around each individual cluster to clearly display the data points in the image that are within each cluster.

Step 322 of process 300 is similar to block 222 of process 200. At step 322, the computing component 110 may perform data bias assessment on the clusters of the target image. Data bias assessment may be performed by assessing distribution differences across the clusters of the reference images with the clusters of the target image. The computing component 110 may compare the clusters in the target image with the clusters in each reference image in the subset of images, and analyze a distribution difference of the clusters between the target image and each individual reference image in the subset of images. Data bias may be determined once the clusters in the target image have been compared and analyzed against the clusters of all of the reference images in the subset of images. A data bias may be present if the overall distribution difference between the clusters is greater than a consistency threshold. The overall distribution difference between the clusters may be a calculated balance of each difference between the clusters of the target image and each reference image in the subset of images. In some embodiments, the consistency threshold may be a pre-determined quantity of a difference. In other embodiments, the consistency threshold may be a pre-determined percentage of the total difference between the clusters of the target image and all of the reference images in the subset of images. When the data bias assessment results in the overall distribution difference between the clusters being greater than the consistency threshold, the computing component 110 may determine an inconsistency result. An inconsistency result may indicate the presence of data bias in the target image.

Step 324 of process 300 is similar to blocks 216 and 224 of process 200. At step 324, the computing component 110 may send a message of data bias found in the subset of images and target image to the user. The computing component 110 may summarize the imbalance assessment performed on the subset of images and data bias assessment performed on the target image. The summary may include all of the labels, attributes and reference image groups used in the imbalance assessment and data bias assessment. The summary may also include the values of the variables determined by the performance of mean shift clustering on the target image and on each reference image in the subset of images. The summary may also include a detailed explanation of what caused the imbalance result and inconsistency result. The computing component 110 may include the summary of the imbalance assessment and the data bias assessment, along with the results of an imbalance and inconsistency, into a message. The computing component 110 may then send the message to the user. The user may be able to fully understand the reasons causing the imbalance in the subset of images and the inconsistency in the target image, and be able to adjust count of reference data and the ML model or other factors of the computing system of ML pipeline to obtain a remove any data bias.

For simplicity of description, the process 300 is described as being performed with respect to a single received target image. It should be appreciated that, in a typical embodiment, the computing component 110 may manage a plurality of target images in short succession of one another. For example, in some embodiments, the computing component 110 can perform many, if not all, of the steps in process 300 on a plurality of target images as the target images are received.

As explained, the process 300 may provide a solution in improving the detection of potential data bias in a ML training pipeline and enabling more accurate predictions in image assessments. Process 300 may also provide improvements in the computational process of the ML training pipeline model by incorporating concurrent pipeline processing across multiple CPU resources. These improvements may also mitigate manual user inspection, mitigate trial and error for image segmentation, augment accuracy in feature detection, and accelerate computational performance of the solution.

Figure 4:
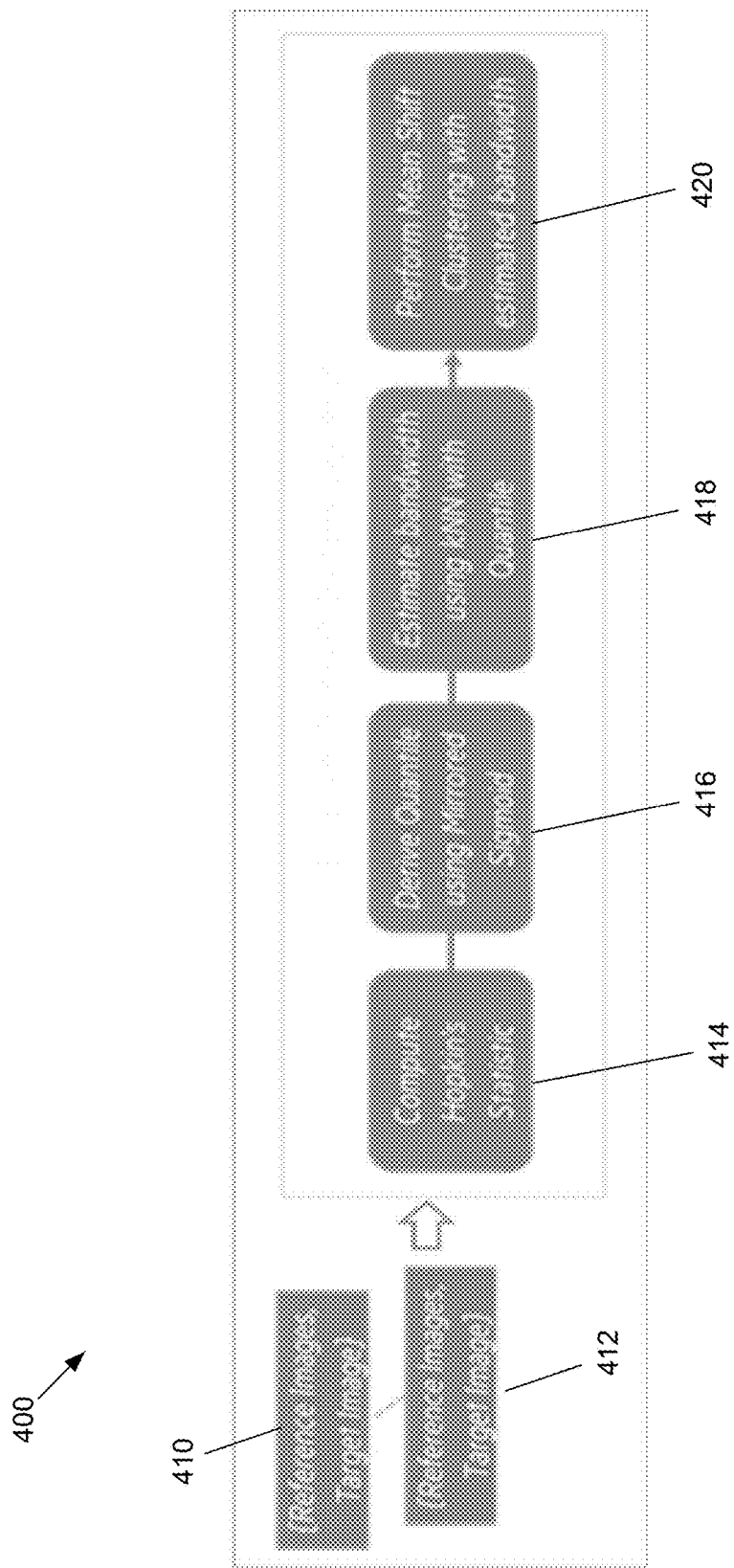
FIG. 4 is an example illustration of a process for performing mean shift clustering on an image according to various embodiments of the present disclosure.

FIG. 4 illustrates an example scenario in which the process 400 may perform mean shift clustering on input image datasets, for example, in order to determine one or more clusters in each image of the input image datasets. In some embodiments, the process 400 can be executed, for example, by the computing component 110 of FIG. 1. In other embodiments, the process 400 may be implemented as the computing component 110 of FIG. 1. The computing component 110 may be, for example, the process 200 of FIG. 2, the process 300 of FIG. 3, and the computing component 500 of FIG. 5. The computing component 110 may include a server.

Steps 410 and 412 of process 400 are similar to blocks 210 and 212 of process 200. At steps 410 and 412, the computing component 110 receives a target image and extracts a subset of reference images from an image database. Before mean shift clustering may be performed, the computing component 110 may receive, from a user, a target image. The target image may include one or more features, attributes, and/or labels. Features may include prominent segments in images of persons, objects, structures, items, and any other matter that can be displayed in an image. Attributes may include age, gender, race, ethnicity, religion, income, demography, material, and any other factors or features that may be directly associated with one or more features in a particular image. Labels may be classifications or descriptions of the overall image. In some embodiments, attributes associated a target image may be assigned by the user before inputting the target image into the device 150. In other embodiments, attributes associated with the target image may be determined after the target image has been received by the computing component 110, using one or more algorithms to detect attributes of an image. The target image may be labeled with a classification or description that describes the type of image it is or what is displayed in the image. In some embodiments, labels of the target image may be assigned before the target image is inputted into the device 150. In other embodiments, labels of the target image may be determined after the computing component 110 receives the target image, by scanning the target image and determining one or more labels to be assigned to the target image according to features that are displayed in the image.

In an example, a target image may be an x-ray image displaying features of a human body, such as the lungs. Before the user inputs the target image into the device 150, the user may assign attributes of the person whose lungs and heart are shown in the x-ray image. The user may assign the attributes of $50k for income, and French for ethnicity. After the image has been received by the device 150, the computing component 110 may use one or more algorithms to determine any additional attributes associated with the person whose lungs and heart are displayed in the x-ray target image, such as 56 for age, male for gender, and White/Caucasian for race. The target image may also be labeled with a classification of "lungs" before the target image is inputted into the device 150.

The computing component 110 may then extract a subset of images from an image database. After receiving the target image and determining the one or more attributes associated with the target image, the computing component may first identify a group or subset of reference images from a reference image database, where the subset of reference images are chosen based on the classification label of the target image and/or the attributes associated with the target image. The reference images may be considered as source image datasets. The reference image database may contain a large number of images, with each image belonging to one or more subsets based on any combination of classification labels and attributes associated with each image. The image database may be stored in the database 120. After a subset of reference images have been identified according to the classification label(s) and/or attribute(s) of the target image, the computing component 110 may extract the subset of reference images from the reference image database.

At step 414, the computing component 110 computes the Hopkins Statistic for each reference image and the target image. After the target image has been received and the subset of reference images has been identified and extracted, the computing component 110 may proceed with the performance of mean shift clustering on the target image and each reference image in the subset. Mean shift clustering may include four steps. In the first step, the computing component 110 may determine the Hopkins Statistic ("H") of a particular image. The Hopkins Statistic may be used to assess the clustering tendency of a data set in the particular image. Assessing the clustering tendency of a data distribution in an image may test the spatial randomness of the data by measuring the probability that a given data set is generated by a uniform data distribution. The Hopkins Statistic (H) may be a value between 0 and 1. If H is more towards the value of 0, then the data is uniformly distributed and there are no meaningful clusters of data in the respective image. If H is more towards the value of 1, then the data is not uniformly distributed and the image contains meaningful clusters of data.

The Hopkins Statistic (H) formula may consist of variables with the symbols of "n," "$x_i$," and "$y_i$." The symbol "n" may represent a set of data points from a real data set in the particular image. The symbol "$x_i$" may represent the distance from each real point to each's respective nearest real data point neighbor. In an example, if point "$p_i$" is a first point in the real data set and its nearest neighbor is point "$p_j$" then "$x_i$" is the distance between "$p_i$" and "$p_j$". The symbol "$y_i$" may represent the distance between each artificial data point to each's respective nearest artificial data point neighbor, where each artificial data point is represented using the symbol "$q_i$." Artificial data points may be determined from a generated simulated data set drawn from a random uniform distribution with "n" data points. The Hopkins Statistic (H) may represent the mean nearest neighbor distance in the random data set divided by the sum of the mean nearest neighbor distances in the real and across the simulated data set. The Hopkins Statistic (H) may consist of the following formula:

$$H = \frac{\sum_{i=1}^{n} y_i}{\sum_{i=1}^{n} x_i + \sum_{i=1}^{n} y_i}$$

At step 416, the computing component 110 derives the Quantile value for each reference image and the target image. After the Hopkins Statistic (H) has been computed, the computing component 110 may proceed to the second step of mean shift clustering, of determining a Quantile value ("Q") for the particular image. The Quantile value (Q) may be determined automatically using a mirrored sigmoid function from the Hopkins Statistic (H). The Quantile value (Q) may consist of the variables with the symbols of "H," "a," and "b." The symbol "H" may represent the Hopkins Statistic. The symbol "a" may be 0.5, indicating the normalized value from 0 to 1 of "H." The symbol of "b" may be a constant with a default optimum value of 10 for the sigmoid, and is tunable to adjust the slope. The Quantile value (Q) formula may then be the following: $Q=1/(1+\exp(b*(H-a)))$.

At step 418, the computing component 110 estimates the kernel bandwidth of each reference image and the target image. After the Quantile value (Q) has been determined, the computing component 110 may then proceed to the third step of determining the estimated kernel bandwidth for the particular image. To determine the estimated kernel bandwidth, the computing device 110 may first determine the number of neighbors ("k-NN") by multiplying the number of data points ("Y") in the particular image with the Quantile Value (Q). After the number of neighbors (k-NN) has been determined, it may be used by the computing component 110 to determine the estimated kernel bandwidth. The kernel bandwidth may be the average pairwise distance calculated by k-NN between the data samples.

At step 420, the computing component 110 performs mean shift clustering for each reference image and the target image. After the estimated kernel bandwidth has been computed, the computing component 110 may proceed to the fourth step of performing mean shift clustering on the particular image. The mean shift clustering performed on the particular image may determine one or more clusters of data distribution in the particular image. Each cluster in the particular image may represent a feature of the particular image. Each feature represented by a cluster may be a feature that is important or that stands out in the particular image. Mean shift clustering may be performed on each reference image in the subset of images and on the target image. In some embodiments, the mean shift clustering of each image may be performed in series. In other embodiments, the mean shift clustering of each image may be performed in parallel across multiple processors 342 in the computing system 300. The ability to perform the mean shift clustering of multiple images in parallel across multiple processors may accelerate the computational performance process of clustering images. The acceleration of the computational performance process of clustering images may further lead to the acceleration of the computational performance process of performing the data bias assessment of the target image.

Figure 5:
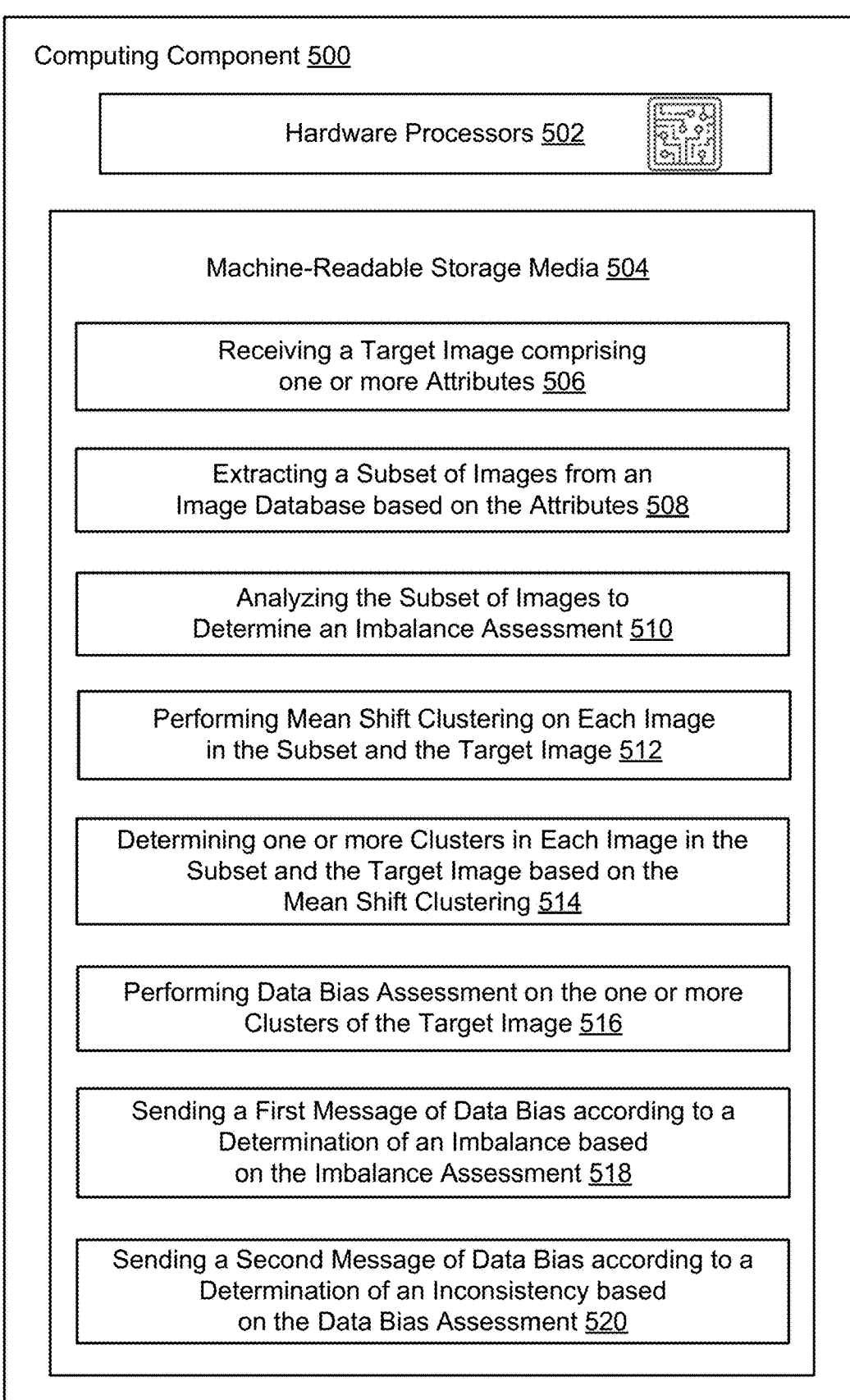
FIG. 5 is an example computing component that includes one or more hardware processors and machine-readable storage media storing a set of machine-readable/machine-executable instructions that, when executed, cause the one or more hardware processors to perform an illustrative method of detecting potential ML bias in input image datasets according to various embodiments of the present disclosure.

FIG. 5 illustrates a computing component 500 that includes one or more hardware processors 502 and machine-readable storage media 504 storing a set of machine-readable/machine-executable instructions that, when executed, cause the hardware processor(s) 502 to perform an illustrative method of reducing computing costs while maintaining network services and performance. It should be appreciated that there can be additional, fewer, or alternative steps performed in similar or alternative orders, or in parallel, within the scope of the various examples discussed herein unless otherwise stated. The computing component 500 may be implemented as the computing component 110 of FIG. 1, the process 200 of FIG. 2, the process 300 of FIG. 3, and process 400 of FIG. 4. FIG. 5 summarizes and further elaborates on some aspects previously described.

At step 506, the hardware processor(s) 502 may execute machine-readable/machine-executable instructions stored in the machine-readable storage media 504 to receive a target image from a user. The target image may include one or more features, attributes, and/or labels. In some examples, the target image will be assigned one or more features, attributes, and/or labels before it is received from the user. In other examples, the one or more features, attributes, and/or labels of the target image will be identified and assigned to the target image after the target image has been received from the user.

At step 508, the hardware processor(s) 502 may execute machine-readable/machine-executable instructions stored in the machine-readable storage media 504 to extract a subset of images from an image database. After receiving the target image and determining the one or more attributes and/or labels associated with the target image, a group or subset of reference images from a reference image database may be identified and extracted. The subset of reference images are chosen based on the labels and/or attributes associated with the target image.

At step 510, the hardware processor(s) 502 may execute machine-readable/machine-executable instructions stored in the machine-readable storage media 504 to analyze the subset of images to determine an imbalance assessment. After extracting the subset of images from the image database according to the labels and/or attributes of the target image, the subset of images may be analyzed by performing a class imbalance assessment on the subset of images. The class imbalance assessment may indicate if the subset of images extracted based on the classification labels and/or attributes of the target image contain any potential data bias.

To perform class imbalance assessment, one or more reference image groups containing similar classification labels and/or attributes as the target image may be identified from the reference image database. After one or more reference image groups has been identified, the quantity of images in each reference image group may be determined. The different quantities of images for each reference image group may then be analyzed and compared against the total quantity of images amongst all of the reference image groups. Such analysis and comparison may determine an average quantity or percentage of images in a particular reference image group amongst all of the reference image groups. In some embodiments, the average quantity or percentage of images may represent an imbalance threshold or minimum number of reference images that are necessary in each reference image group in order to obtain accurate predictions in the analysis of input target images and datasets. In other embodiments, the imbalance threshold may be a pre-determined percentage of the total quantity of reference images between all of the reference image groups. A subset of reference images that do not contain a quantity or percentage of reference images that is equal to or greater than the imbalance threshold may be determined to be imbalanced. An imbalanced subset of reference images may introduce potential data bias and provide inaccurate predictions in the ML model.

At step 512, the hardware processor(s) 502 may execute machine-readable/machine-executable instructions stored in the machine-readable storage media 504 to perform mean shift clustering on each image in the subset of images and the target image. The mean shift clustering performed on each image may determine one or more clusters of data distribution per image. Each cluster in an image may represent a feature of the respective image. Each feature represented by a cluster may be a feature that is important or that stands out in the respective image.

The algorithm for mean shift clustering may include 4 steps. The first step may be the computation of the Hopkins Statistic ("H") for a particular image. The second step may be to use the Hopkins Statistic (H) to derive the Quantile value ("Q") for the particular image, using a mirrored sigmoid function from H. The third step may be to estimate the kernel bandwidth for the particular image, using the Quantile value (Q). The fourth step may be to perform the mean shift clustering on the particular image. This mean shift clustering algorithm may be performed for each reference image in the subset of images and for the target image.

At step 514, the hardware processor(s) 502 may execute machine-readable/machine-executable instructions stored in the machine-readable storage media 504 to determine one or more clusters in each image in the subset of images and the target image. The computing component 110 may group each individual cluster of data points in an image by placing a border around each individual cluster to clearly display the data points in the image that are within each cluster.

At step 516, the hardware processor(s) 502 may execute machine-readable/machine-executable instructions stored in the machine-readable storage media 504 to perform data bias assessment on the one or more clusters of the target image. Data bias assessment may be performed by assessing distribution differences across the clusters of the reference images with the clusters of the target image. The clusters in the target image may be compared with the clusters in each reference image in the subset of images. The comparison of the clusters may be analyzed to determine a distribution difference of the clusters between the target image and each individual reference image in the subset of images. Data bias may be determined once the clusters in the target image have been compared and analyzed against the clusters of all of the reference images in the subset of images. A data bias may be present if the overall distribution difference between the clusters is greater than a consistency threshold. When the data bias assessment results in the overall distribution difference between the clusters being greater than the consistency threshold, the computing component 110 may determine an inconsistency result. An inconsistency result may indicate the presence of data bias in the target image.

At step 518, the hardware processor(s) 502 may execute machine-readable/machine-executable instructions stored in the machine-readable storage media 504 to send a first message of data bias according to a determination of an imbalance based on the imbalance assessment. An imbalance may be determined when the imbalance assessment results with a subset of reference images not containing a quantity or percentage of reference images that is equal to or greater than the imbalance threshold. A summary of the imbalance assessment may be created and placed in a message. The summary may include detailed information regarding the images, labels, attributes, and features used in the imbalance assessment. The summary may also include a detailed analysis of the cause of the imbalance result. The message may include the summary and suggestions on how to remove data bias and obtain a balanced result in the imbalance assessment.

At step 520, the hardware processor(s) 502 may execute machine-readable/machine-executable instructions stored in the machine-readable storage media 504 to send a second message of data bias according to a determination of an inconsistency based on the data bias assessment. An inconsistency may be determined when the data bias assessment results with the overall distribution difference between the clusters being greater than a consistency threshold. A summary of the data bias assessment may be created and placed in a message. The summary may include detailed information regarding the images, labels, attributes, features, clusters of data, and variables of the mean shift clustering used in the data bias assessment. The summary may also include a detailed analysis of the cause of the inconsistency result. The message may include the summary and suggestions on how to remove data bias and obtain a consistent result in the data bias assessment.

Subsequently, the hardware processor(s) 502 may receive subsequent target images from the user and repeat the aforementioned steps for each of the subsequent images received, until target images are no longer being received from the user.

Figure 6:
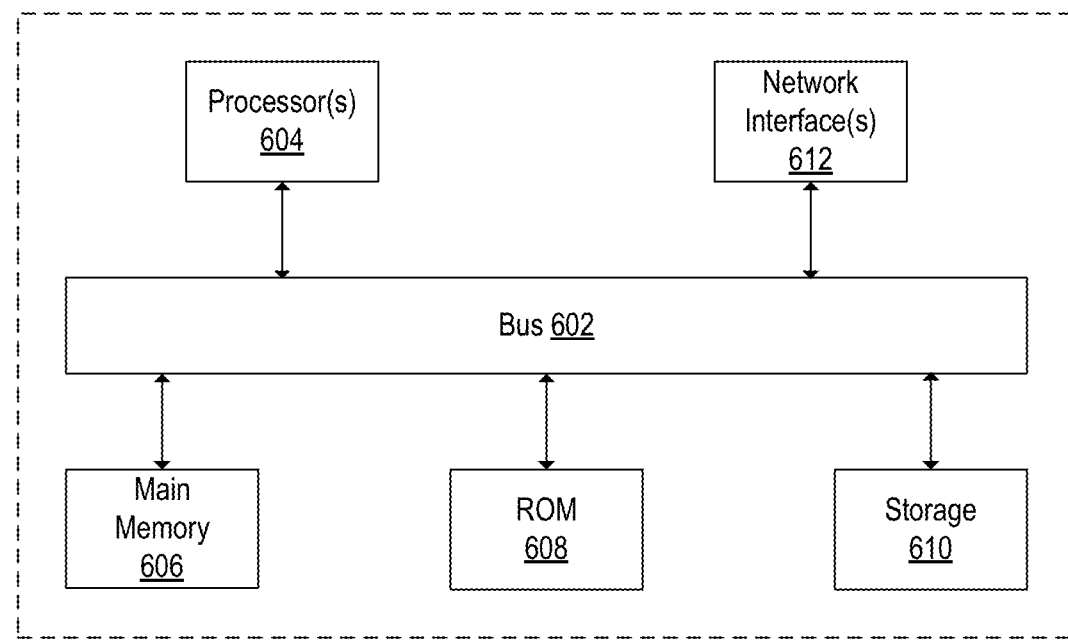
FIG. 6 illustrates a block diagram of an example computer system in which various embodiments of the present disclosure may be implemented.

FIG. 6 illustrates a block diagram of an example computer system in which various examples of the present disclosure may be implemented. The computer system 600 can include a bus 602 or other communication mechanism for communicating information, one or more hardware processors 604 coupled with the bus 602 for processing information. The hardware processor(s) 604 may be, for example, one or more general purpose microprocessors. The computer system 600 may be an example of a client-server communication or similar device.

The computer system 600 can also include a main memory 606, such as a random access memory (RAM), cache and/or other dynamic storage devices, coupled to the bus 602 for storing information and instructions to be executed by the hardware processor(s) 604. The main memory 606 may also be used for storing temporary variables or other intermediate information during execution of instructions by the hardware processor(s) 604. Such instructions, when stored in a storage media accessible to the hardware processor(s) 604, render the computer system 600 into a special-purpose machine that can be customized to perform the operations specified in the instructions.

The computer system 600 can further include a read only memory (ROM) 608 or other static storage device coupled to the bus 602 for storing static information and instructions for the hardware processor(s) 604. A storage device 610, such as a magnetic disk, optical disk, or USB thumb drive (Flash drive), etc., can be provided and coupled to the bus 602 for storing information and instructions.

Computer system 600 can further include at least one network interface 612, such as a network interface controller module (NIC), network adapter, or the like, or a combination thereof, coupled to the bus 602 for connecting the computer system 600 to at least one network.

In general, the word "component," "modules," "engine," "system," "database," and the like, as used herein, can refer to logic embodied in hardware or firmware, or to a collection of software instructions, possibly having entry and exit points, written in a programming language, such as, for example, Java, C or C++. A software component or module may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices, such as the computing system 600, may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of an executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 600 may implement the techniques or technology described herein using customized hard-wired logic, one or more ASICs or FPGAs, firmware and/or program logic which in combination with the computer system 600 that causes or programs the computer system 600 to be a special-purpose machine. According to one or more examples, the techniques described herein are performed by the computer system 600 in response to the hardware processor(s) 604 executing one or more sequences of one or more instructions contained in the main memory 606. Such instructions may be read into the main memory 606 from another storage medium, such as the storage device 610. Execution of the sequences of instructions contained in the main memory 606 can cause the hardware processor(s) 604 to perform process steps described herein. In alternative examples, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. The non-volatile media can include, for example, optical or magnetic disks, such as the storage device 610. The volatile media can include dynamic memory, such as the main memory 606. Common forms of the non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

The non-transitory media is distinct from but may be used in conjunction with transmission media. The transmission media can participate in transferring information between the non-transitory media. For example, the transmission media can include coaxial cables, copper wire and fiber optics, including the wires that comprise the bus 402. The transmission media can also take a form of acoustic or light waves, such as those generated during radio-wave and infra-red data communications.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain examples include, while other examples do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A computer-implemented method of a computing system comprising a server and a database, the method comprising:
   receiving a target image, wherein the target image comprises one or more attributes;
   extracting a subset of images from an image database based on the one or more attributes;
   analyzing the subset to determine an imbalance assessment;
   performing mean shift clustering on each image in the subset and the target image, wherein the mean shift clustering comprises:
      computing a Hopkins statistic on data points of a first image;
      determining a quantile value based on the computed Hopkin statistic;
      determining a kernel bandwidth based on a second quantity of the data points and the determined quantile value; and
      performing the mean shift clustering based on the determined kernel bandwidth;
   determining one or more clusters in each image in the subset and the target image based on the performed mean shift clustering;
   performing data bias assessment on the one or more clusters of the target image, wherein the data bias assessment is performed according to a machine learning (ML) algorithm;
   sending a first message of data bias according to a determination of an imbalance based on the imbalance assessment; and
   sending a second message of data bias according to a determination of an inconsistency based on the performed data bias assessment.

2. The computer-implemented method of claim 1, wherein, prior to the receiving the target image, assigning the one or more attributes to the target image.

3. The computer-implemented method of claim 1, wherein, after the receiving the target image, determining the one or more attributes based on an attribute detection algorithm.

4. The computer-implemented method of claim 1, wherein the determined imbalance assessment comprises:
   determining one or more quantities of images in one or more image groups in the image database;
   determining if a first quantity of the subset is below an imbalance threshold according to the one or more quantities of images in the one or more image groups; and
   if the first quantity of the subset is below the imbalance threshold, determining the imbalance in the subset.

5. The computer-implemented method of claim 1, wherein the performed data bias assessment comprises:
   comparing the one or more clusters in the target image to the one or more clusters in each image in the subset;
   determining a first difference between the one or more clusters in the target image to the one or more clusters in a first image in the subset;
   determining a total difference wherein the total difference is a calculated balance of each difference for each of the images in the subset; and
   if the total difference between the one or more clusters is greater than a consistency threshold, determining the inconsistency between the target image and the subset.

6. A computing system comprising:
one or more processors; and
a memory storing instructions that, when executed by the one or more processors, cause the one or more processors to:
   receive a target image, wherein the target image comprises one or more attributes;
   extract a subset of images from an image database based on the one or more attributes;
   analyze the subset to determine an imbalance assessment;
   perform mean shift clustering on each image in the subset and the target image;
   determine one or more clusters in each image in the subset and the target image based on the performed mean shift clustering, wherein the mean shift clustering comprises:
      computing a Hopkins statistic on data points of a first image;
      determining a quantile value based on the computed Hopkin statistic
      determining a darnel bandwidth based on a second quantity of the data points and the determined quantile value; and
      performing the mean shift clustering based on the determined kernel bandwidth;
   perform data bias assessment on the one or more clusters of the target image, wherein the data bias assessment is performed according to a machine learning (ML) algorithm;
   send a first message of data bias according to a determination of an imbalance based on the imbalance assessment; and
   send a second message of data bias according to a determination of an inconsistency based on the performed data bias assessment.

7. The computing system of claim 6, wherein, prior to the receive the target image, assign the one or more attributes to the target image.

8. The computing system of claim 6, wherein, after the receive the target image, determine the one or more attributes based on an attribute detection algorithm.

9. The computing system of claim 6, wherein the determined imbalance assessment comprises:
   determine one or more quantities of images in one or more image groups in the image database;
   determine if a first quantity of the subset is below an imbalance threshold according to the one or more quantities of images in the one or more image groups; and
   if the first quantity of the subset is below the imbalance threshold, determine the imbalance in the subset.

10. The computing system of claim 6, wherein the performed data bias assessment comprises:
    compare the one or more clusters in the target image to the one or more clusters in each image in the subset;
    determine a first difference between the one or more clusters in the target image to the one or more clusters in a first image in the subset;
    determine a total difference wherein the total difference is a calculated balance of each difference for each of the images in the subset; and
    if the total difference between the one or more clusters is greater than a consistency threshold, determine the inconsistency between the target image and the subset.

11. A non-transitory storage medium storing instructions that, when executed by at least one processor of a computing system, cause the computing system to perform a method comprising:
    receiving a target image, wherein the target image comprises one or more attributes;
    extracting a subset of images from an image database based on the one or more attributes;
    analyzing the subset to determine an imbalance assessment;
    performing mean shift clustering on each image in the subset and the target image, wherein the mean shift clustering comprises:
       computing a Hopkins statistic on data points of a first image;
       determining a quantile value based on the computed Hopkin statistic;
       determining a kernel bandwidth based on a second quantity of the data points and the determined quantile value; and
       performing the mean shift clustering based on the determined kernel bandwidth;
    determining one or more clusters in each image in the subset and the target image based on the performed mean shift clustering;
    performing data bias assessment on the one or more clusters of the target image, wherein the data bias assessment is performed according to a machine learning (ML) algorithm;
    sending a first message of data bias according to a determination of an imbalance based on the imbalance assessment; and
    sending a second message of data bias according to a determination of an inconsistency based on the performed data bias assessment.

12. The non-transitory storage medium of claim 11, wherein, prior to the receiving the target image, assigning the one or more attributes to the target image.

13. The non-transitory storage medium of claim 11, wherein, after the receiving the target image, determining the one or more attributes based on an attribute detection algorithm.

14. The non-transitory storage medium of claim 11, wherein the determined imbalance assessment comprises:
    determining one or more quantities of images in one or more image groups in the image database;
    determining if a first quantity of the subset is below an imbalance threshold according to the one or more quantities of images in the one or more image groups; and
    if the first quantity of the subset is below the imbalance threshold, determining the imbalance in the subset.

15. The non-transitory storage medium of claim 11, wherein the performed data bias assessment comprises:
    comparing the one or more clusters in the target image to the one or more clusters in each image in the subset;
    determining a first difference between the one or more clusters in the target image to the one or more clusters in a first image in the subset;
    determining a total difference wherein the total difference is a calculated balance of each difference for each of the images in the subset; and
    if the total difference between the one or more clusters is greater than a consistency threshold, determining the inconsistency between the target image and the subset.

* * * * *